US012447362B1

(12) United States Patent
Truesdell et al.

(10) Patent No.: US 12,447,362 B1
(45) Date of Patent: Oct. 21, 2025

(54) LANYARD

(71) Applicants: Buckingham Manufacturing Company, Inc., Binghamton, NY (US); Keith Blakeslee, Vancouver, WA (US); Scott Barnes, Vancouver, WA (US)

(72) Inventors: Kevin Truesdell, Binghamton, NY (US); Keith Blakeslee, Vancouver, WA (US); Scott Barnes, Vancouver, WA (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 249 days.

(21) Appl. No.: 17/740,243

(22) Filed: May 9, 2022

Related U.S. Application Data

(60) Provisional application No. 63/185,720, filed on May 7, 2021.

(51) Int. Cl.
*A62B 35/00* (2006.01)
*A63B 29/02* (2006.01)

(52) U.S. Cl.
CPC .......... *A62B 35/0043* (2013.01); *A63B 29/02* (2013.01)

(58) Field of Classification Search
CPC .............. A62B 35/0043; A62B 35/005; A62B 35/0056; A62B 35/0075; A62B 29/02; A62B 29/028
USPC ........................................... 248/218.4; 182/9
See application file for complete search history.

(56) References Cited

U.S. PATENT DOCUMENTS

| | | | | |
|---|---|---|---|---|
| 8,464,832 | B1 * | 6/2013 | Rullo | A62B 35/0075 182/5 |
| 8,505,683 | B1 * | 8/2013 | Dirrig | A63B 27/00 182/9 |
| 9,622,566 | B1 * | 4/2017 | Pinholster, Jr. | A45F 3/24 |
| 9,907,389 | B2 * | 3/2018 | Conlin | D03D 11/02 |
| D876,206 | S * | 2/2020 | Pinholster | D8/356 |
| 10,604,892 | B1 * | 3/2020 | Caliri | D07B 1/148 |
| 2002/0104711 | A1 * | 8/2002 | Nichols | A62B 1/16 182/5 |
| 2005/0247521 | A1 * | 11/2005 | Diggle | A63B 27/00 182/133 |
| 2007/0114095 | A1 * | 5/2007 | Swierski | A62B 35/0075 182/9 |
| 2008/0000719 | A1 * | 1/2008 | Jones | A62B 35/0075 182/3 |
| 2019/0134438 | A1 * | 5/2019 | Liggett | A62B 35/04 |

FOREIGN PATENT DOCUMENTS

| | | | |
|---|---|---|---|
| DE | 202010013040 U1 * | 3/2011 | A63B 27/00 |

* cited by examiner

*Primary Examiner* — Christopher Garft
(74) *Attorney, Agent, or Firm* — Bond, Schoeneck & King, PLLC; Frederick J. M. Price

(57) ABSTRACT

A lanyard comprising a rope with segmented apertures and a prusik. The prusik can be attached to one of the apertures to help a user stay attached to the tree or pole.

10 Claims, 7 Drawing Sheets

LANYARD

REFERENCE TO RELATED APPLICATIONS

This application claims priority to U.S. Provisional Patent Application Ser. No. 63/185,720, filed on May 7, 2021 and entitled "Lanyard" the entirety of which is incorporated herein by reference.

BACKGROUND

The present disclosure relates generally to safety devices. More particularly, to lanyards.

The use of safety ropes and lanyards for climbing is well known in the prior art. Conventional lanyards are typically not adjustable. And conventional adjustable lanyards typically only go around the back side of the tree and do not have a chocking feature.

Description of the Related Art Section Disclaimer: To the extent that specific. patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety (ies).

SUMMARY

Embodiments of the lanyard recognize the problems and shortcomings of conventional lanyards with segmented apertures and a prusik that when connected help the user stay attached to the tree. In the event that one side of the lanyard gets cut or damaged between the connection points around the tree and the connection points at the user's saddle/belt the prusik will remain attached to an aperture providing an extra layer of safety for the user. Embodiments of the lanyard are more secure than a conventional lanyards and can also be used as a false crotch to allow the user to descend from the tree using the lanyard as a false crotch/anchor. The prusik can go around the front of the tree and attach to one of the apertures depending on size of tree to give the lanyard a chocking feature. This also allows the device to be used as an anchor for rescue.

BRIEF DESCRIPTION OF THE DRAWINGS

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments.

DETAILED DESCRIPTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
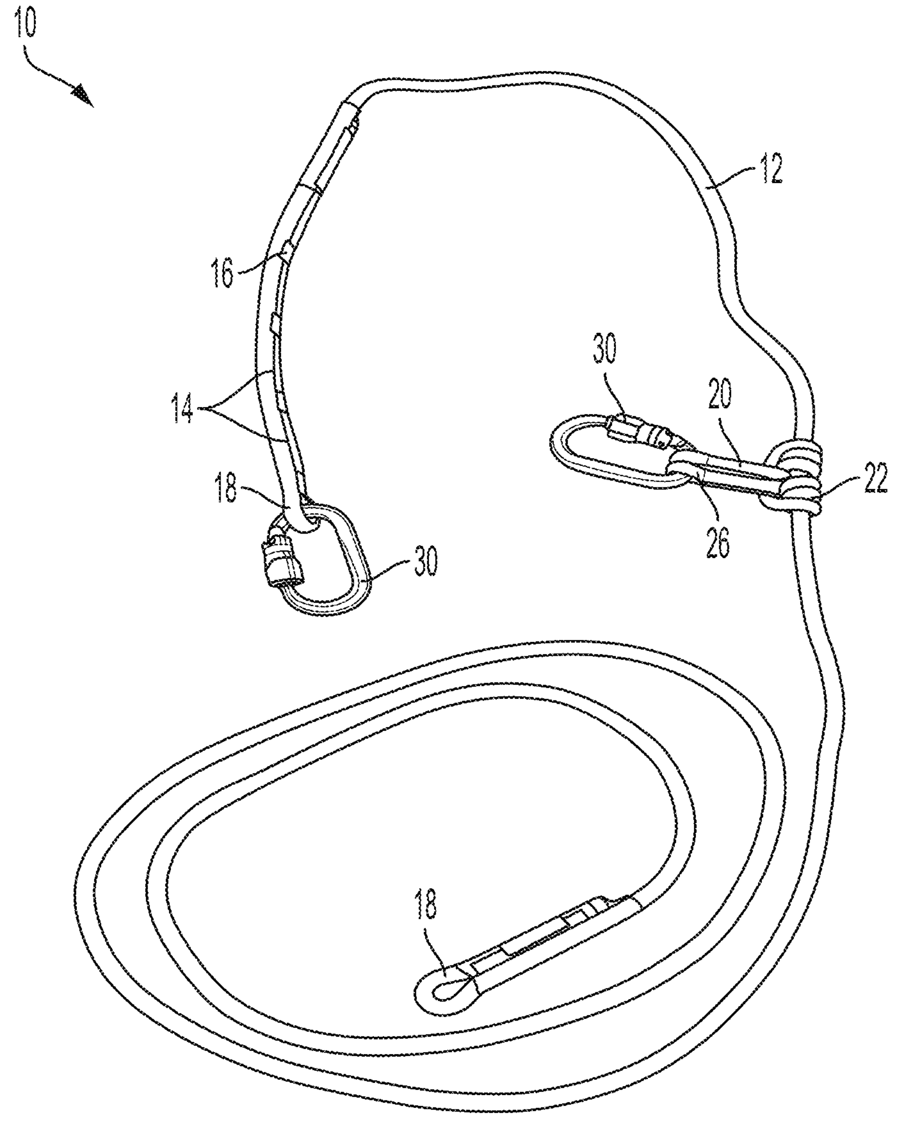
FIG. 1 is a perspective view of a lanyard according to one embodiment.

Referring now to FIG. 1, one embodiment of the lanyard, referred to generally by reference numeral 10, consists generally of a main rope 12 and a prusik 20. The prusik 20 can be attached to the main rope 12 such that it can be moved to different positions along the main rope 12. The main rope 12 can be wrapped around a pole or tree and the prusik 20 can connect to an aperture 14 of the main rope 12 to secure the main rope 12 around the pole.

The main rope 12 can be implemented by any suitable material known in the art that is strong enough to meet industry standards, including but not limited to rope or webbing. The main rope 12 can be of any diameter that is suitable to stitch through and not pucker. The length of the main rope 12 can be any suitable length that is long enough to wrap around a pole and the device can be made in multiple lengths for different size poles.

The main rope 12 has a first end and a second end. Each end of the main rope 12 can have an eye 18. The eye(s) 18 can have connector(s) 30 or other rope systems attached to it. The eye(s) 18 can be formed by any suitable means such as but not limited to splicing the rope, folding it on itself, or stitching the ends of the rope together. In one example eye 18 is a rated stitched eye. In one embodiment, the main rope 12 is folded on itself to form an eye 18 at the fold. A connector 30 or other hardware or rope systems can be attached to the eye 18.

In one embodiment the main rope 12 has at least one aperture 14. In one example the main rope 12 has a plurality of apertures 14 on the first end. The apertures 14 are configured to have a connector 30, prusik 20, other hardware, or rope systems drawn through or attached to them. In one example, this can be done in order to encircle an object such as a pole with the main rope 12. Apertures 14 can be along any portion of the main rope 12 or can be along the entire length of the main rope 12. The apertures 14 can be formed by attachments 16 which can connect two portions of the main rope 12 together.

The prusik 20 can be used as a means of adjusting the length of the main rope 12 and connecting two portions of the main rope 12 together. A user can attach the prusik 20 to any one of the apertures 14. The prusik 20 can have a first end and a second end where the first end can be attached to the main rope 12 and the second end can be removably attached to one of the apertures 14. Prusik 20 can comprise a coil 22 on the first end which defines an opening for the main rope 12 to pass through and the second end can comprise a prusik eye 26.

The coil 22 of the prusik 20 can accept the main rope 12 and then be slid along the main rope 12 to a desired position depending on the user's needs. The coil 22 can be made tight around the main rope 12 such that it won't move once it is in a desired position along the main rope 12. In one example, this is done by pulling the prusik eye 26 away from the coil 22. The prusik eye 26 can attach to a connector 30 such as a D-ring, circular ring, or other hardware. The prusik 20 according to one embodiment has a large eye 26 that can be attached to the host lanyard rope via a hitch/knot. The prusik 20 can be made of any suitable material known in the art, including but not limited to climbing rope or webbing.

The connectors 30 can be accomplished by any attachment device as should be known in the art such as but not limited to a carabiner, D-clip, snap hook, or ring (oval, round, square, etc.), opening or non-opening. The connectors can be attached at any attachment point such as an eye or an aperture 14 or any point along the length of the rope.

Figure 2:
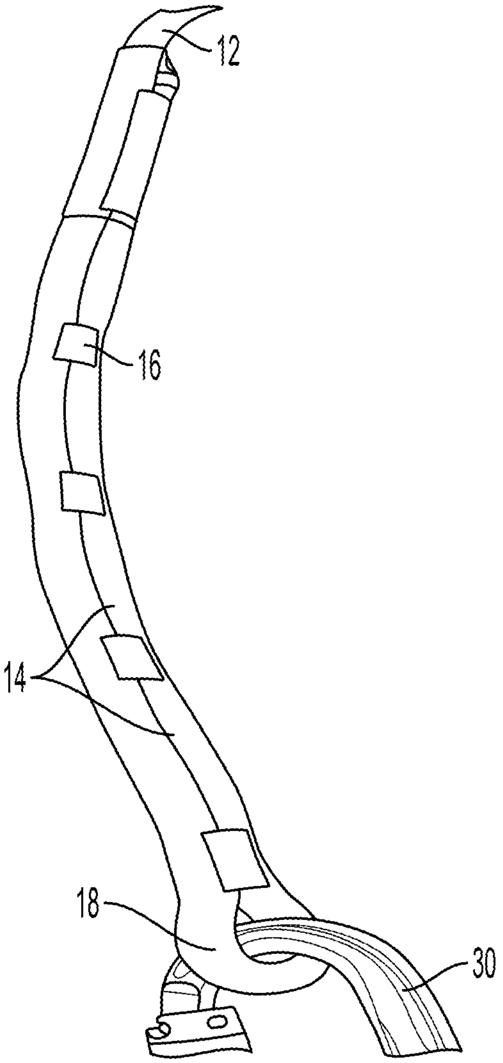
FIG. 2 is a perspective view of a portion of the main rope according to one embodiment.

Referring now to FIG. 2, in one example, there are multiple apertures 14 that are each separated by attachments 16 along at least a portion of the main rope 12. There can be any number of apertures 14 defined along any portion of the main rope 12. The size and number of apertures 14 can vary. The inside diameters of the apertures 14 can be any size that is sufficiently large enough to fit any connection device or ropes up to 9/16" in diameter as these are the most common ropes used for climbing purposes. All of the apertures 14 can be the same size or they can vary in size.

The apertures 14 can be accomplished with two ropes or with a single rope. For example, apertures 14 can be formed by splicing or cutting a single rope. In another example, the apertures 14 are formed by attachments 16 which are accomplished by stitching the two ropes, or two portions of the same rope, together using a stitch pattern that join the two ropes side by side. The stitching can comprise an inner row and an outer row of stitching. In one embodiment the attachments are life support rated stitching. The attachments 16 can also be accomplished by other means suitable in the art such as wrapping or gluing the ropes together. The attachments 16 can be spaced apart at any suitable distance such that the apertures 14 are large enough to have connector 30, prusik 20, other hardware, or a rope system drawn between the attachments 16.

Figure 3:
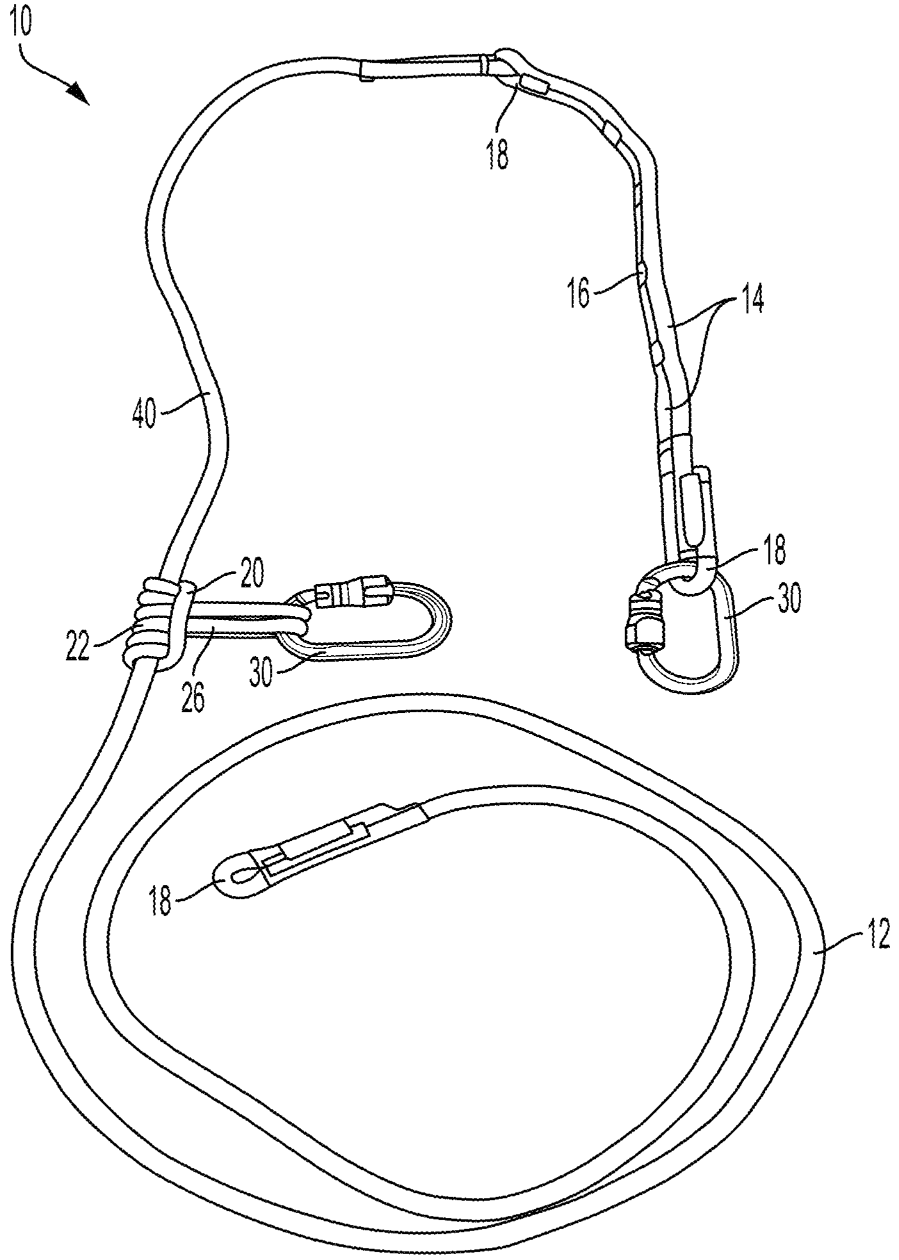
FIG. 3 is a perspective view of a lanyard according to one embodiment.
Figure 4:
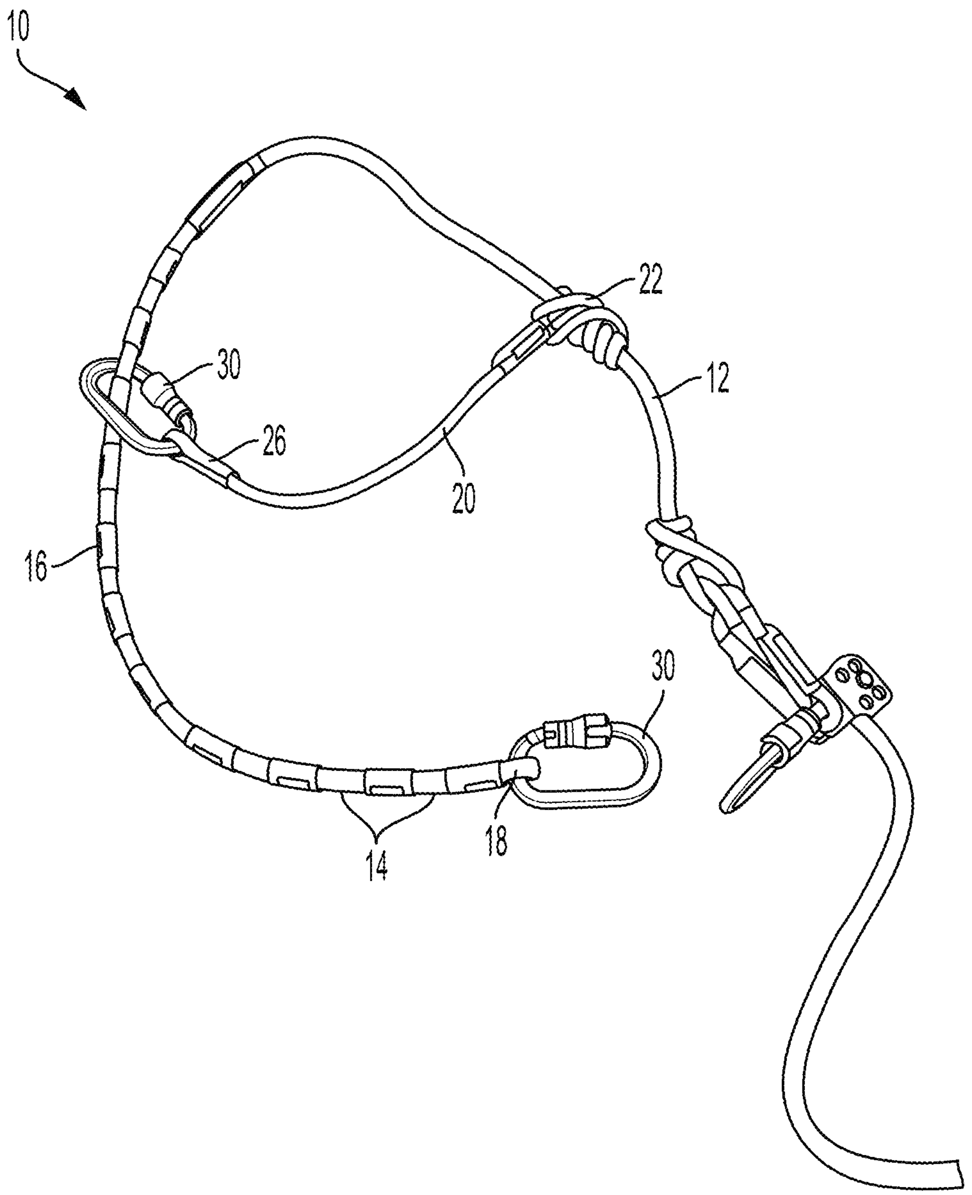
FIG. 4 is a perspective view of a lanyard according to one embodiment.

Referring now to FIG. 3, in the embodiment shown, the main rope 12 has attachments 16 repeated a set distance from each other to form apertures 14 the full length of the main rope 12. Both the first end and the second end of the main rope 12 have an eye 18, the first end has a connector 30 attached to the eye 18 and the second end has a second rope 40 attached to the eye 18. Here. The prusik 20 is attached to the second rope 40. In some embodiments the second rope 40 can also have aperture(s) 14 and/or attachments 16.

Figure 5:
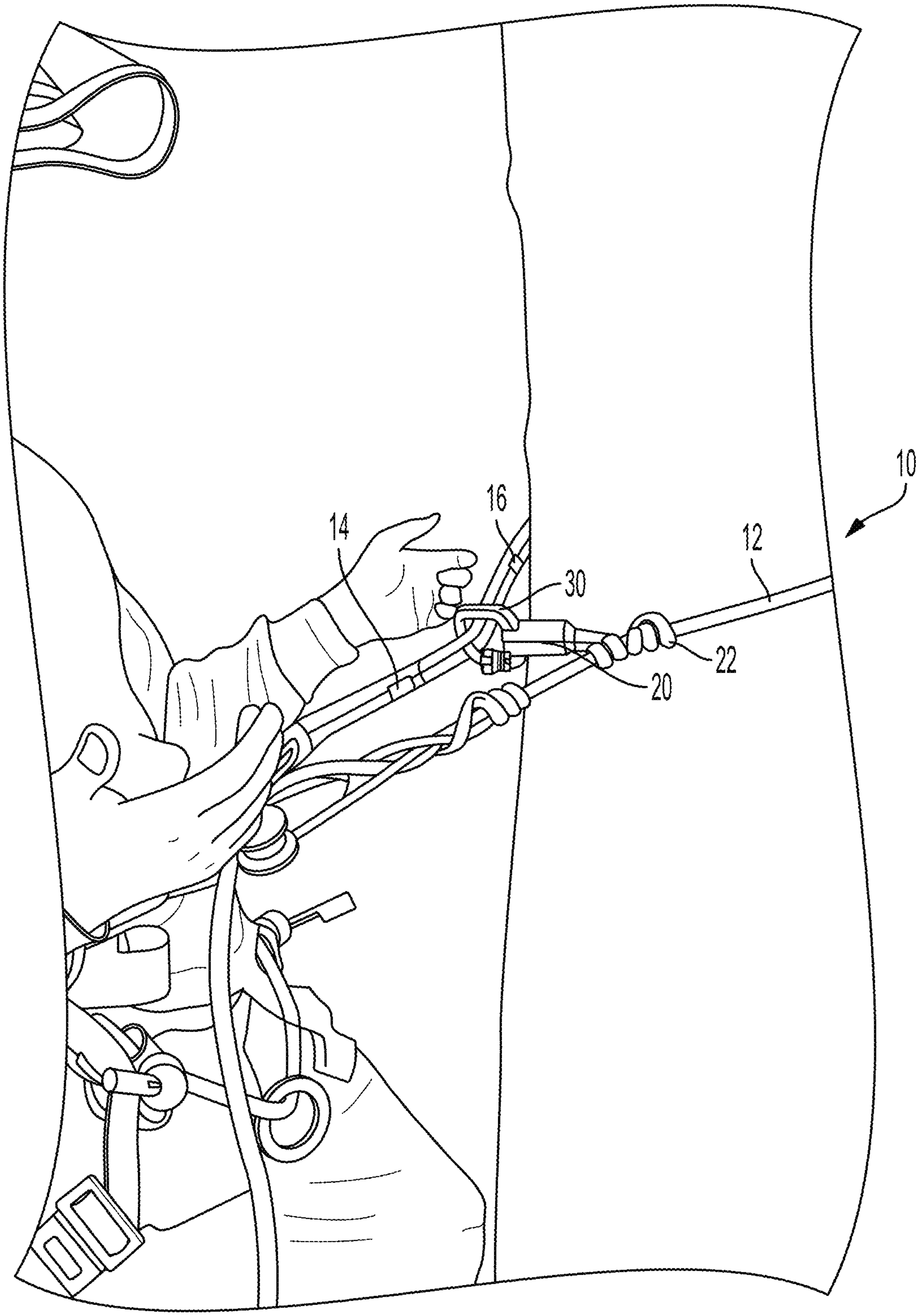
FIG. 5 is a perspective view of a lanyard according to one embodiment wrapped around a pole.
Figure 6:
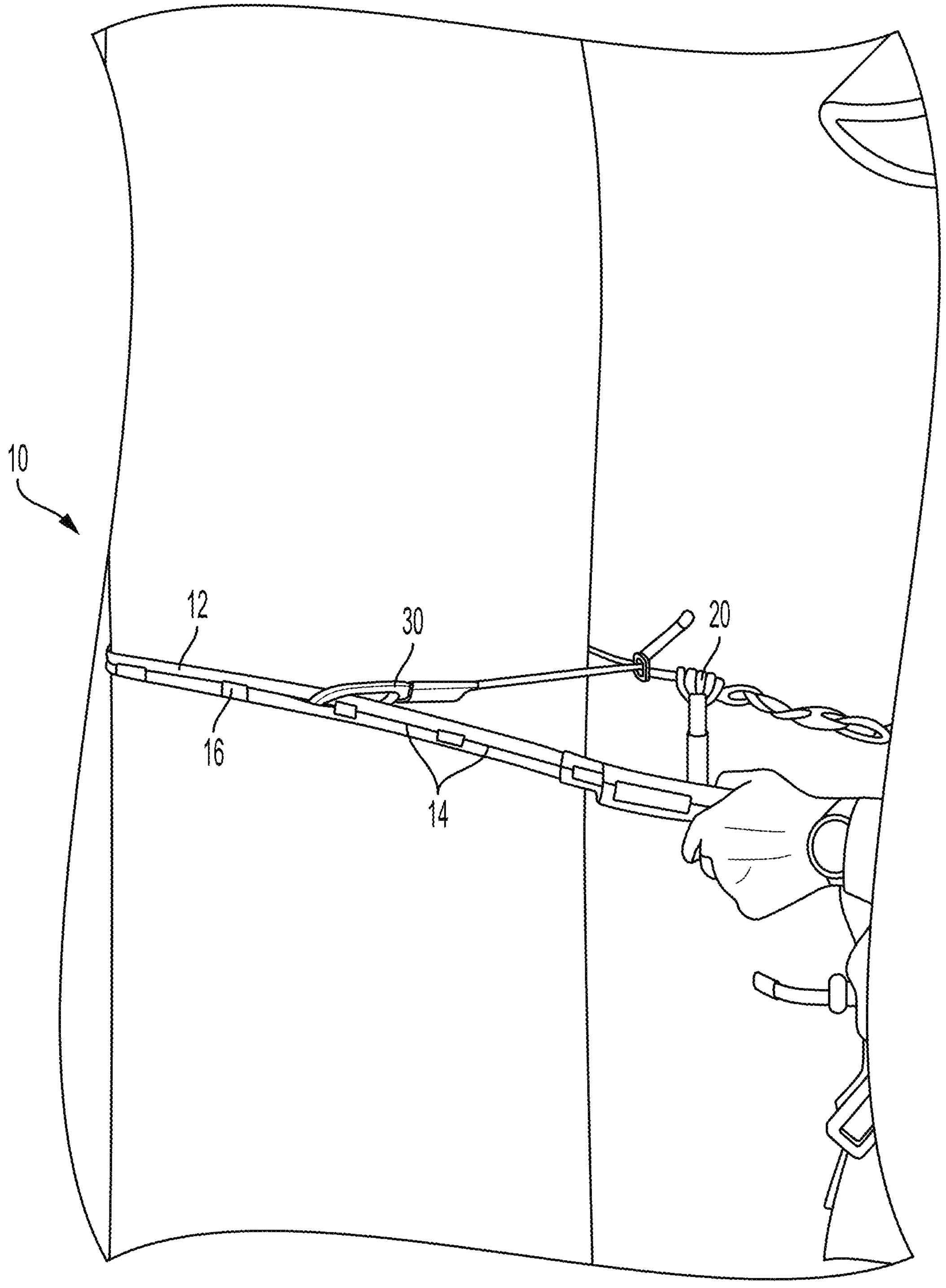
FIG. 6 is a perspective view of a lanyard according to one embodiment wrapped around a pole.
Figure 7:
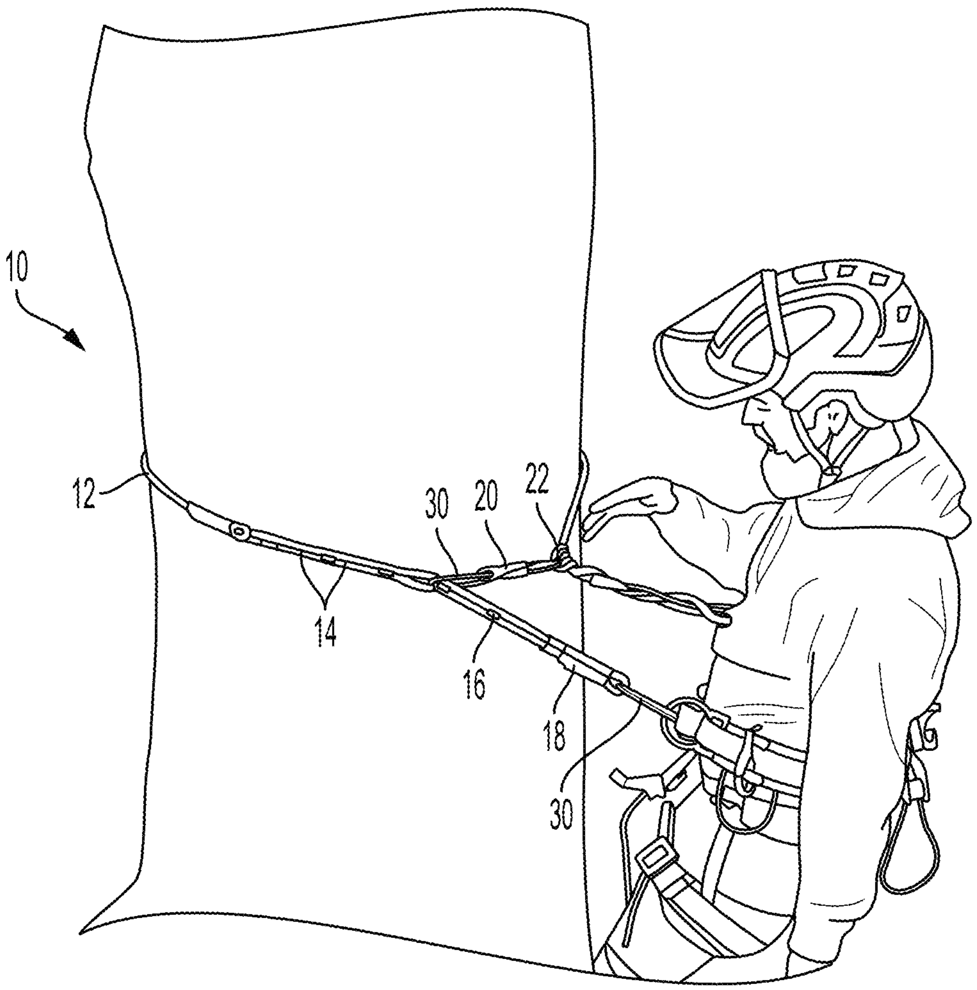
FIG. 7 is a perspective view of a lanyard according to one embodiment wrapped around a pole.

Referring now to FIGS. 5-7, a user can attach the first end of the main rope 12 to the user. The user can pass the lanyard 10 around the pole or tree and attach the second end of the main rope 12 to the user. The user can attach connectors 30 to the D-rings on their body belt or harness. The user can also place a connector 30 attached to prusik 20 into an aperture 14. The user can choose the aperture 14 that they believe will be best to allow the lanyard 10 to be secured around the pole. The user can then determine distance from pole for example by leaning back and evaluating the lanyard 10. If this distance is incorrect, they can disconnect the prusik 20 from the from the aperture 14, then reattach the prusik 20 to a different aperture 14 that would provide them the correct distance of the user from the pole.

In the event of an emergency where the climber becomes unconscious or their main climbing system becomes compromised, the prusik 20 allows for two other rated connection points a left termination and a right hitch to be used conjointly as a rated and choking friction saver/false crotch where a climb line/rescue line can be installed on.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A lanyard, comprising:

a first rope having a length L, wherein a portion of the rope is folded on itself forming a double rope segment and further comprises at least two apertures along the length of the first rope;

a second separate rope directly attached to the first rope; and a prusik having a first end attached to the second rope and a second end which can be removably attached to one of the at least two apertures.

2. The lanyard of claim 1, wherein each of the apertures are the same size.

3. The lanyard of claim 1, wherein at least one of the apertures has a different size than another aperture.

4. The lanyard of claim 1, wherein the apertures are formed by splicing the first rope.

5. The lanyard of claim 1, wherein each aperture is formed in between subsegments of the double rope segment each of which is connected by an attachment.

6. The lanyard of claim 5, wherein each attachment is stitching.

7. The lanyard of claim 1, wherein there are apertures along the entire length of the first rope.

8. The lanyard of claim 1, wherein the first rope comprises an eye on each end.

9. The lanyard of claim 1, wherein the second end of the prusik comprises a connector.

10. The lanyard of claim 1, wherein the second end of the prusik is directly attached to a carabiner.

* * * * *